July 25, 1967 — M. W. WOLFE — 3,332,466

SPIRAL CORD CENTER PATCH

Filed Oct. 24, 1962 — 2 Sheets-Sheet 1

INVENTOR.
MERRITT W. WOLFE
BY
J. B. Holden
ATTORNEY

United States Patent Office 3,332,466
Patented July 25, 1967

3,332,466
SPIRAL CORD CENTER PATCH
Merritt W. Wolfe, Akron, Ohio, assignor to The Goodyear Tire & Rubber Company, Akron, Ohio, a corporation of Ohio
Filed Oct. 24, 1962, Ser. No. 232,836
13 Claims. (Cl. 152—367)

This invention relates to an improved construction for a tire repair patch, and more particularly, to improvements in positioning the cord reinforcement within the patch, thus providing multi-directional strength characteristics.

Certain prior tire repair patches are based entirely upon plies each containing cord reinforcement positioned angularly disposed with respect to each other in an attempt to form an isotropic stress-carrying patch. One of the inherent disadvantages of a patch that contains several plies of cord reinforcement is the fact that the overall thickness becomes unduly large, then, too, the patch becomes very heavy, thus causing difficulty in attaining a balanced tire. This invention provides a structure for overcoming the difficulties which have heretofore been prevalent in repair patches having straight orientated cord reinforcing.

It is therefore an object of this invention to provide an improved tire repair patch in which the primary reinforcement cords extend radially outward in a plurality of convolutions.

It is another object of the present invention to so provide a tire repair patch having a minimum number of reinforcement plies.

It is a further object of this invention to make a tire repair patch having a minimum thickness, thereby reducing the patch weight which in turn will result in a more uniformly balanced tire.

Another object of the present invention is to provide a tire repair patch that can be positioned over a break in a tire casing without regard to orientating the patch reinforcing with respect to the tire cords.

Yet another object of this invention is to provide a tire repair patch that will resist a direct thrust load in all directions.

The invention will be more readily understood and other objects will appear as the description proceeds in reference to the accompanying drawings in which.

As previously mentioned, the repair of breaks or fractures in tires presents many unique problems. It has been determined that in the repair of a fracture, the strength lost because of damaged or cut cords must be equalled by the reinforcement applied in the form of a patch. In large heavy duty tires, such as truck tires, the replacement of equivalent cord strengths results in a very thick patch that occupies a large area surrounding the fracture; then also a patch having equivalent strength as compared to the ruptured cords which it covers is quite heavy and results in a rough riding tire. The improved tire patch of this invention permits superior repair of fractures that are in close proximity to each other.

Figure 1:
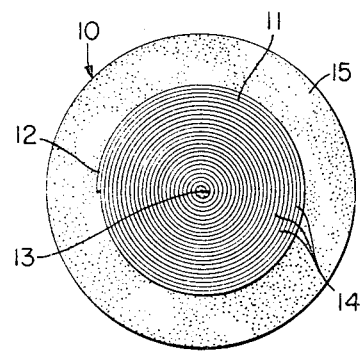
FIGURE 1 is a plan view of a tire repair patch containing a convoluted reinforcement cord.
Figure 2:
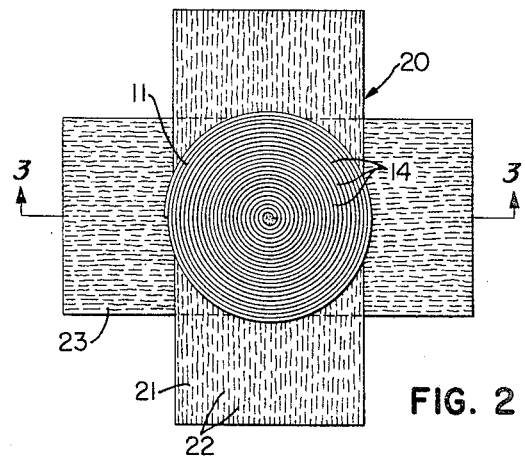
FIGURE 2 is a plan view of a repair patch containing reinforcement cord in the form of a spiral.
Figure 4:
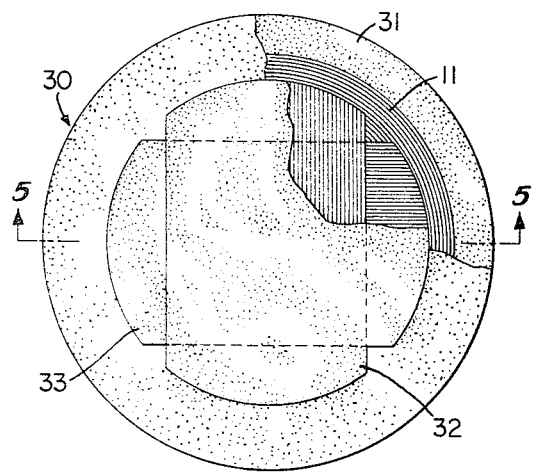
FIGURE 4 shows a repair patch; part in section showing the cord orientation of all plies.
Figure 3:
FIGURE 3 is a cross-section taken along section 3—3 of FIGURE 2.
Figure 5:
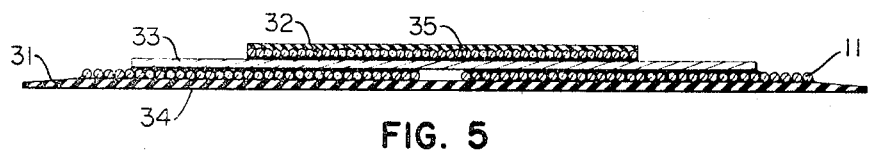
FIGURE 5 is an enlarged cross-section of the patch shown in FIGURE 4 along line 5—5 of FIGURE 4.

Referring to FIGURE 1 a tire repair patch 10 is shown with the principal cord reinforcement or ply 11 having a cord 12 extending in the form of a spiral path or a plurality of convolutions of unequal diameter. The ply 11 is formed by commencing the cord 12 in the center 13, then spiralling outward therefrom so that each convolution 14 is in close proximity to the immediate adjacent smaller convolution. The completed spiral ply 11 is coupled with suitable uncured rubber stock such as layer 15 which may be placed on one or both sides of spiral ply 11. The spiral ply 11 can also be in the form of concentric rings as will be hereinafter set forth. FIGURE 2 shows a tire repair patch 20 in which ply 11 is coupled with additional reinforcement carried in the uncured rubber stock. Ply 11 is placed on a piece of uncured rubber 21 which contains evenly dispersed short length filaments 22 of a material such as nylon or finely drawn wire. Filaments 22 have an orientation that is predominantly parallel with respect to the longitudinal direction of rubber layer 21. An additional section of unsecured rubber 23 is positioned adjacent section 21; however, the filament orientation is at right angles to the filaments contained in section 21. FIGURE 3 shows how the individual convolutions 14 of the spiral ply 11 reinforcing are placed in the patch. FIGURE 4 shows a composite tire repair patch 30 wherein spiral cord ply 11 is placed on uncured rubber stock 31 that contains no filament reinforcing. In addition to the spiral cord ply 11, plies 32 and 33 each containing parallel cords are positioned such that their respective cord reinforcements are at right angles to each other. FIGURE 5 shows a cross-section of patch 30. Side 34 is placed adjacent the tire carcass, thus side 35, which contains plies 32 and 33, is situated farthest from the repair. The purpose of plies 32 and 33 is twofold; first, the extra uni-directional cords help to prevent an undue stress buildup in the small convolutions of the main stress-carrying spiral cord 11; second, the extra plies 32 and 33 prevent the spiral cord 11 from moving out of planar orientation during the cure cycle. It has been determined that the spiral cord will have a tendency to form a somewhat conical configuration during cure because of cord shrinkage unless held in position as described above.

Figure 6:
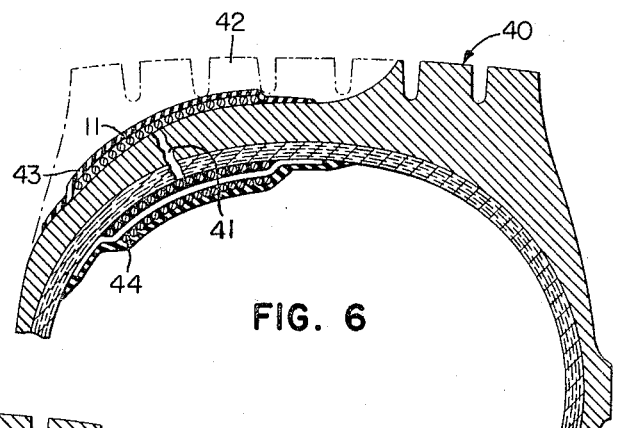
FIGURE 6 is a cross-section of a tire showing a repair without removing the fractured material.

FIGURE 6 shows a tire casing 40 which has a fracture 41. Tread portion 42 is removed by cutting or grinding. A repair patch 43 containing a spiral reinfrocement ply 11 is adhered in a centered position over fracture 41. In a similar manner patch 44 is placed over the fracture on the inside of the tire. Additional uncured tread rubber is then placed on the exterior of the tire casing, in order to replace tread portion 42 which has been removed. The assembled repair is then cured in a suitable mold. The resulting repair as set forth above has a low profile and does not present enough additional weight so as to greatly unbalance the tire.

Figure 7:
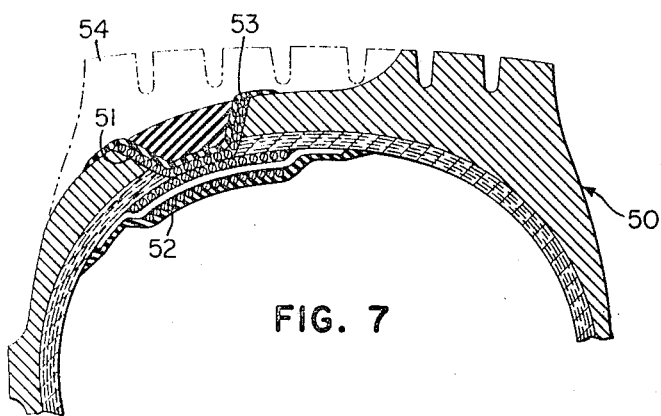
FIGURE 7 is similar to FIGURE 6; however, the fractured section has been removed.

FIGURE 7 shows a tire casing 50 similar in view to FIGURE 6; however, the fractured portion has been cut away leaving a generally conical hole 51. The inside patch 52 is located in a centered position with respect to the conical hole. Patch 53 is then centered over the large opening of the conical hole. In this particular modification patch 53 is backed with a ply of uncured rubber containing no randomly dispersed fibers, thus when a uniform inward pressure is applied, the spiral reinforcing cord will deform inwardly and align itself against the wall of hole 51. Sufficient rubber stock is then placed over the repair area to fill the remainder of hole 51 as well as make up the cutaway section 54. When cured, the portion of rubber protruding into the repair area acts as a key in addition to a backup for patch 53.

Figure 8:
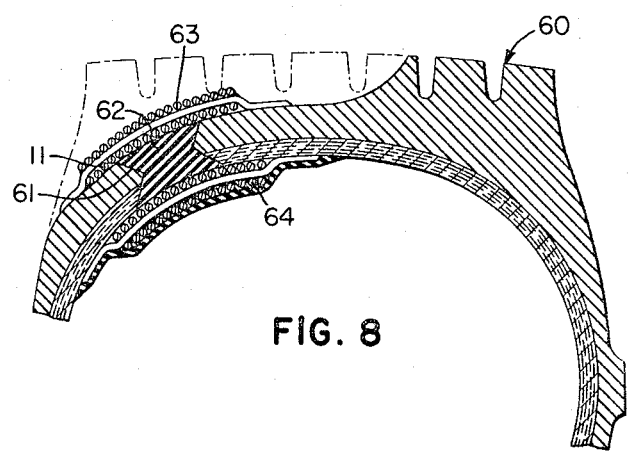
FIGURE 8 shows a tire cross-section wherein a plug of repair material has been installed between spiral cord patches.

FIGURE 8 depicts a cross-section of a tire 60 in which the fractured section has been removed, thus leaving a hole 61 that has its smallest diameter in the central portion of the tire. A plug of uncured stock 62 is tailored to fit hole 61. A repair patch 63 containing two 90° orientated cord layers in addition to the primary spiral cord ply 11 is positioned on the outside of plug 62. In a similar manner an identical patch 64 is located on the inner side of plug 62. Additional tread stock is added to the exterior of the tire and the assembly is then cured in a suitable mold.

Figure 9:
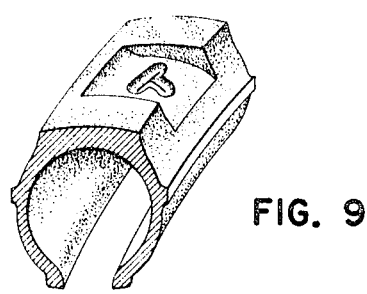
FIGURE 9 shows a section of a tire in which a fracture has been prepared for patching.

FIGURE 9 shows a fractured tire wherein the damaged area has been removed and the resulting hole has beveled walls. The repair is performed in a manner similar to the repair shown in FIGURE 7. The spiral cord patch is pressed down into the irregular hole so that the spiral cords will contact the beveled sides thereof. Thus, it can be seen that the spiral cord patch will work equally well as a repair element in an unsymmetrical repair hole.

Figure 10:
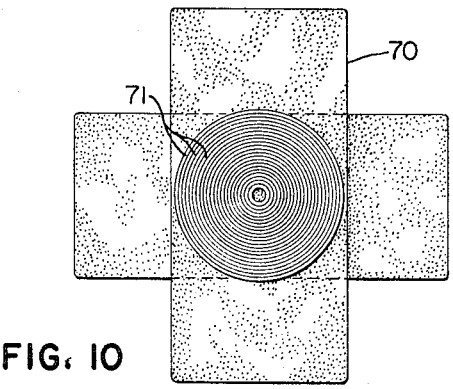
FIGURE 10 shows another embodiment of the invention wherein the cord reinforcing consists of a pluarity of concentric cords.

FIGURE 10 shows a patch 70 which is another embodiment of the spiral cord patch; however, the cord is not continuous but rather is a series of separate cords or rings 71 arranged in concentric order. The primary advantage of patch 70 is, when utilized in the manner shown in FIGURE 7, it will conform to the conical wall of the repair area and present evenly spaced rings 71 which are capable of carrying the load at that particular location without having any direct contact with adjacent rings. This is of particular value as the tire is flexed during use.

Figure 11:
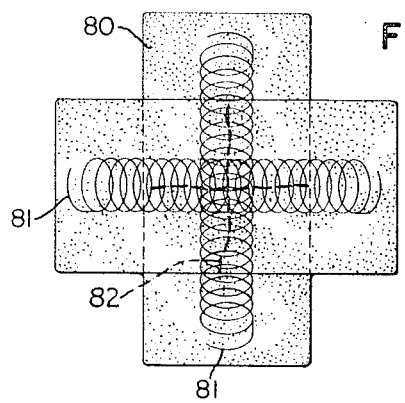
FIGURE 11 shows a further embodiment of the invention having the reinforcing cord convoluted and arranged at right angles.

FIGURE 11 sets forth a patch 80 which illustrates another variation of a spiral cord patch. The reinforcing cord is in two or more continuous lengths 81 and arranged so that the flattened spirals are at right angles with respect to each other. This arrangement provides reinforcement along the broken edges of an "X-break" 82 caused by a blunt object pucturing the tire carcass. The spiral cord and concentric ring cord patches excell in their capability to resist a puncture type of loading. For example, if a concentrated load were applied exteriorly to the center of patch 50 of FIGURE 7, the load would be transmitted to the annular cords 14. The ensuing load would then be carried by hoop tension within the cord or cords. Another advantage of the spiral reinforced patch is that post repair ruptures are reduced. In an ordinary tire repair patch the cord orientation is aligned so that it parallels the existing tire cords. Often a plane of weakness will develop within the patch area; however, the patch, because of extra reinforcing, will not fail. The weakened area will progress along the cords away from the patch area and will cause a breakthrough in a section remote from the original repair area.

In the above description of my invention I do not wish to be limited to the use of any particular cord material, even though the cords are normally made from rayon or nylon. In my invention metallic wire or any other suitable material may be employed as reinforcement within the tire patch. The term "cord" as used in describing the invention is not intended to be limited to a cord in which the filaments are twisted. The term "cord" is considered applicable to a group of filaments of parallel untwisted orientation. The term "cord" is also deemed applicable to a monofilament.

While certain representative embodiments and details have been shown for purposes of illustrating the invention, it will be apparent to those skilled in this art that various changes and modifications may be made therein without departing from the spirit or scope of the invention.

I claim:

1. A tire repair unit comprising a plurality of fiber reinforced rubber strips each having the fiber reinforcement thereof oriented longitudinally of the strip, the strips being aligned in crossed superimposed relationship with the fibers thereof arranged substantially at right angles with one another, and a layer of primary cord reinforcement the cord of which is arranged in a plurality of convolutions, each convolution being spaced from adjacent convolutions, said layer of primary cord reinforcement being stacked in relation to and centered relative to the superimposed portions of said rubber strips.

2. A tire repair unit comprising at least two vulcanizable rubber layers containing short lengths of filamentary material, the filamentary material of each layer being oriented in a single direction, said layers being disposed in angular relationship, and a spirally wound reinforcement cord positioned adjacent and contacting at least one of said layers, thus providing a repair unit of balanced strength.

3. A tire repair unit as claimed in claim 2 having therein a continuous reinforcement cord with the convolutions thereof radially spaced from each adjacent convolution.

4. A tire repair patch comprising a bottom ply, a middle reinforcement ply contiguous thereto and a top ply laid over the bottom and middle plies, said bottom ply formed from unreinforced vulcanizable rubber, said middle ply formed of reinforcement cord in the form of a continuous spiral and said top ply formed from unreinforced vulcanizable rubber, whereby a repair patch is produced having equal strength in all directions.

5. A tire repair patch comprising a plurality of rubber coated cord plies, a bottom ply of rubber, a spiral wound reinforcement cord disposed adjacent said rubber ply, said cord plies superimposed on the spiral wound reinforcement cord, the cords of said plies being angularly disposed with respect to each other.

6. A tire repair patch comprising two rubberized filament reinforced cord plies, a bottom ply of unreinforced vulcanizable rubber, a spiral wound filament reinforcement cord wound so that the entire cord is one continuous piece and the convolutions thereof are contained in radially spaced planar relationship to each other, said spiral cord positioned next to said bottom ply and the two rubberized filament reinforced cord plies placed next to said spiral cord such that the reinforcement cords of one ply are angularly disposed with respect to the reinforcement cords of the other ply.

7. In combination, a repaired tire carcass having an inside and an outside in which the carcass contains a plurality of reinforcemtnt cords part of which have sustained an injury thereof, a first repair patch vulcanized on the outside of the injured area, a second repair patch vulcanized on the inside of the injured area, said first and second repair patches each containing a continuous cord wound in the form of a spiral all parts of which are arcuate, said first and second patches in juxtaposed relationship such that the spiral reinforcement cords of each patch are facing the ruptured area.

8. The method of repairing a tire including the steps of: removing tread rubber in the vicinity of the rupture, forming a frusto-conical hole in the cord area at the point of rupture, so that the large end of said hole is on the tire exterior, positioning a first spirally wound cord patch on the inside of the tire and directly over the small end of the frusto-conical hole, adhering a second spirally wound cord patch over the large end of the frusto-conical hole, forcing said second patch into the hole until the spirally wound cords are in abutting relationship with the tapered walls of the frusto-conical hole, adhering said second patch to the walls of said hole and to said first patch, adding uncured rubber stock and curing in a mold whereby the added rubber stock has filled the cavity within the spirally wound patch.

9. A repair patch reinforced with two convoluted lengths of cord, the convolutions of each length extending in a longitudinal direction and each length arranged at right angles with the other.

10. A repair patch as claimed in claim 9 wherein the convolutions of each length are of equal diameter.

11. In combination, a repaired tire carcass having therein multi-layered reinforcement cord which has a ruptured section, said section extending through the layers of reinforcement cord and having the surface thereof prepared so that it is of frusto-conical configuration, a repair patch vulcanized in said ruptured section, said patch having a spirally oriented reinforcement cord which at least in part is arranged in a frusto-conical shape and is received within the frusto-conical surface of said section in contiguous relationship with the ends of the cut tire cord in said ruptured area; thus permitting a load to be carried across said ruptured section.

12. In combination, a repaired tire carcass having an inside and an outside in which the carcass contains a plurality of reinforcement cords part of which have sustained an injury thereof, a first repair patch positioned on the outside of the injured area, a second repair patch positioned on the inside of the injured area, said first and second repair patches each containing a continuous reinforcement cord wound in the form of a spiral and having adjacent thereto rubberized filament reinforced cord plies such that the plies thereof are angularly disposed with respect to each other, said first and second patches in juxtaposed relationship such that the spiral reinforcement cords of each patch are facing the ruptured area.

13. A tire repair unit comprising a plurality of fiber reinforced rubber strips, each having the fiber reinforcement thereof oriented longitudinally of the strip, the strips being arranged in crossed superimposed relationship with the fibers thereof arranged substantially at right angles with one another, and a layer of primary cord reinforcement the cord of which is arranged in a plurality of separate concentric rings, each ring being spaced radially from adjacent rings, said layer of primary cord reinforcement being stacked in relation to and centered relative to the superimposed portions of said rubber strips.

References Cited
UNITED STATES PATENTS

| | | | |
|---|---|---|---|
| 581,235 | 4/1879 | Kenyon | 152—367 |
| 604,636 | 5/1898 | Reynolds | 152—367 |
| 1,374,846 | 4/1921 | Goodlake | 152—369 |
| 1,580,468 | 4/1926 | Cooper | 152—367 |
| 1,653,989 | 12/1927 | Cooper | 152—367 |
| 1,870,275 | 8/1932 | Adams | 28—78 |
| 2,126,254 | 8/1938 | Gowell | 28—78 |
| 2,229,878 | 1/1941 | Wilson | 152—370 |
| 2,344,677 | 4/1944 | Cornell | 152—367 |
| 2,512,309 | 6/1950 | Cornell | 152—367 |

ARTHUR L. LA POINT, *Primary Examiner.*

EUGENE G. BOTZ, MILTON KAUFMAN, *Examiners.*

C. W. HAEFELE, *Assistant Examiner.*